Patented May 25, 1926.

1,586,116

UNITED STATES PATENT OFFICE.

FRANZ RAHN, OF NIEDER-INGELHEIM-ON-THE-RHINE, GERMANY, ASSIGNOR TO C. H. BOEHRINGER SOHN, OF NIEDER-INGELHEIM-ON-THE-RHINE, A GERMAN SOCIETY.

PROCESS FOR THE PRODUCTION OF GLUCOSIDES OF DIGITALIS.

No Drawing.  Application filed July 13, 1925. Serial No. 43,384.

Although the method of producing digitoxine by the extraction of digitalis-leaves with ethyl alcohol has been known for a long time, gitaline was, until now, the only one of the water-soluble glucosides of digitalis fairly well accessible in a technical way. It was obtained by agitating out the watery solution with chloroform. The digitaleine, which is insoluble in chloroform, remains in the watery solution during the course of this process; but so far it had been impossible to produce it in an appropriate technical manner on account of its great sensitiveness. Consequently a considerable part of the heart-affecting substances contained in the digitalis was not used.

According to the present invention, digitaleine and gitaline are produced by treating watery extracts of digitalis-leaves with alcohols hardly soluble in water, such as amyl-alcohol, butyl-alcohol etc. The further working is then effected in a simple way, for instance by distilling off the solvent, such as amyl-alcohol, at a low temperature, whereupon the glucosides are separated from the concentration, for example by means of ether or petroleum-ether. By this process they are obtained in a granular and very pure form. In case the digitaleine and gitaline are to be produced separately, one may proceed in such a way as to withdraw this glucoside from the sediment containing both glucosides, by treating with solvents for gitaline, for instance chloroform. Another method of operating consists in first freeing the watery extract of the digitalis-leaves from gitaline by treating it with chloroform, and in treating it afterwards with amyl-alcohol or the like for the purpose of producing the digitaleine.

*Examples.*

(1). 1 kg. of digitalis-leaves are extracted with 10 litres of water. Then the watery solution is purified by combining with lead acetate and the filtrate is stirred twice with 3 litres of amyl-alcohol in each case. The combined extracts of amyl-alcohol are reduced in volume through evaporation in a vacuum pan and precipitated with dry ether, so long as a sediment still forms. The two glucosides are obtained in the form of slightly brownish corned sediments, which may be purified again by repeated precipitation from amyl-alcohol with ether. For separating the two glucosides, the precipitate obtained is stirred with about ten times its volume of chloroform, which is filtered off from the digitaleine remaining undissolved and is concentrated. Then the gitaline is precipitated from the residue with ether. The leaves extracted with water will yield digitoxine in the well-known manner by means of a renewed extraction with alcohol.

(2). The digitalis-leaves are extracted with about ten times their volume of water. Then the solution is purified with lead acetate (as in Example 1) and the filtrate is stirred twice each time with 3 litres of chloroform, after which the gitaline is precipitated with petroleum-ether from the evaporated chloroform solution. Subsequently the brown mixture stirred with chloroform is treated (as in Example 1) with butyl-alcohol instead of amyl-alcohol and will yield digitaleine of a good quality after the butyl-alcohol has been carefully treated with ether.

The digitalis glucosides obtained by the described process are distinguished by the fact that their physiological efficacy, which is expressed by so-called "frog-doses", is considerably greater than that of preparations made after the methods hitherto known.

Digitoxine corresponds probably to the formula $C_{34}H_{54}O_{11}$. Gitaline is the fraction which can be extracted with chloroform from the aqueous extract of digitalis-leaves. This substance has a melting point of approximately 150–155° and is hardly soluble in water. Digitaleine denotes the group of the heart-affecting glucosides readily soluble in water with the exception of digitalin and digitonin.

Claims:

1. Process for the production of digitalis glucosides, consisting in treating watery extracts of digitalis-leaves with alcohols which are hardly soluble in water.

2. Process for the production of digitalis glucosides, consisting in extracting digitalis-leaves with water and in treating the watery extracts with alcohols which are difficult to dissolve in water.

3. Process for the production of digitalis glucosides, consisting in treating watery extracts of digitalis-leaves with hardly soluble alcohol and also with other solvents.

4. Process for the production of digitalis glucosides, consisting in treating watery extracts of digitalis-leaves with different solvents, including alcohols which are hardly soluble, and in applying the solvents one after the other.

5. Process for the production of digitalis glucosides, consisting in treating the extracts of digitalis-leaves to be worked, first with solvents for gitaline and then with solvents for digitaleine.

6. Process for the production of digitalis glucosides, consisting in treating the watery extracts of digitalis-leaves first with chloroform and afterwards with amyl-alcohol.

7. Process for the production of digitalis glucosides as claimed in claim 1, characterized by withdrawing the gitaline by means of solvents for gitaline from the mixture obtained when treating the watery extracts with alcohol which is hardly soluble in water.

8. Process for the production of digitalis glucoside, consisting in withdrawing gitaline by means of chloroform from a mixture obtained when treating watery extracts with alcohol which is difficult to dissolve in water.

In testimony whereof I affix my signature.

FRANZ RAHN.